US009315396B2

(12) United States Patent
Duke et al.

(10) Patent No.: US 9,315,396 B2
(45) Date of Patent: Apr. 19, 2016

(54) WATER CONSERVATION METHODS COMBINING OSMOTIC MEMBRANE PROCESSED WATER FOR SUBSEQUENT EFFICIENT USE IN COOLING TOWER APPLICATIONS

(75) Inventors: Dan A. Duke, Temecula, CA (US); John L. Kubis, Mission Viejo, CA (US)

(73) Assignee: Water Conservation Technology International, Inc., Temecula, CA (US)

( * ) Notice: Subject to any disclaimer, the term of this patent is extended or adjusted under 35 U.S.C. 154(b) by 1013 days.

(21) Appl. No.: 13/432,201

(22) Filed: Mar. 28, 2012

(65) Prior Publication Data

US 2012/0255908 A1   Oct. 11, 2012

Related U.S. Application Data

(60) Provisional application No. 61/472,299, filed on Apr. 6, 2011, provisional application No. 61/567,021, filed on Dec. 5, 2011.

(51) Int. Cl.
| | |
|---|---|
| *B01D 61/00* | (2006.01) |
| *B01D 63/00* | (2006.01) |
| *C02F 1/44* | (2006.01) |
| *B01D 61/02* | (2006.01) |
| *C02F 1/42* | (2006.01) |
| *C02F 1/66* | (2006.01) |
| *C02F 103/02* | (2006.01) |

(52) U.S. Cl.
CPC .............. *C02F 1/441* (2013.01); *B01D 61/002* (2013.01); *B01D 61/025* (2013.01); *B01D 2311/06* (2013.01); *C02F 1/42* (2013.01); *C02F 1/66* (2013.01); *C02F 2103/023* (2013.01)

(58) Field of Classification Search
CPC .............. C02F 1/66; C02F 5/00; C02F 1/441; C02F 2103/023; C02F 2303/08; B01D 2311/04; B01D 2311/18; B01D 61/025; B01D 61/04
USPC .......................................... 210/650, 644, 639
See application file for complete search history.

(56) References Cited

U.S. PATENT DOCUMENTS

| | | | |
|---|---|---|---|
| 3,532,621 A | 10/1970 | Hough | |
| 3,721,621 A | 3/1973 | Hough | |
| 3,735,604 A | 5/1973 | Asti | |
| 4,188,291 A * | 2/1980 | Anderson ............ | B01D 61/025 203/10 |
| 5,207,921 A | 5/1993 | Vincent | |
| 5,925,255 A | 7/1999 | Mukhopadhyay | |
| 6,391,205 B1 | 5/2002 | McGinnis | |
| 6,537,456 B2 | 3/2003 | Mukhopadhyay | |
| 6,929,743 B2 * | 8/2005 | Diel ..................... | B01D 63/084 210/227 |
| 6,929,749 B2 | 8/2005 | Duke et al. | |
| 6,949,193 B2 * | 9/2005 | Duke ...................... | C23F 15/00 159/47.1 |
| 7,445,712 B2 | 11/2008 | Herron | |
| 7,879,243 B2 | 2/2011 | Al-Mayahi et al. | |
| 8,002,989 B2 | 8/2011 | McGinnis | |
| 2003/0127391 A1 * | 7/2003 | Craft et al. ..................... | 210/651 |
| 2005/0150834 A1 * | 7/2005 | Duke et al. ..................... | 210/652 |
| 2006/0151394 A1 | 7/2006 | Duke et al. | |
| 2009/0159420 A1 | 6/2009 | Duke et al. | |
| 2010/0192575 A1 * | 8/2010 | Al-Mayahi et al. ............. | 60/671 |
| 2011/0278226 A1 * | 11/2011 | Nicoll ........................... | 210/639 |
| 2013/0220581 A1 * | 8/2013 | Herron et al. ............ | 165/104.28 |
| 2013/0305752 A1 * | 11/2013 | Martin ............................. | 62/91 |
| 2014/0263086 A1 * | 9/2014 | Kozlowski et al. ........... | 210/741 |

FOREIGN PATENT DOCUMENTS

WO   2010017303   2/2010

OTHER PUBLICATIONS

PCT International Search Report; mailed Jul. 9, 2012; 7 pages.
Miller, James E. and Lindsey R. Evans; Forward Osmosis: A New Approach to Water Purification and Desalination; Sandia Report, Jul. 2006, Sandia National Laboratories, Albuquerque, New Mexico.
Cath, Tzahi Y., et al.; Forward Osmosis: Principles, applications, and recent developments; Journal of Membrane Science 281 (2006) 70-87; May 31, 2006.
Nicholl, Peter G. et al.; Manipulated Osmosis Applied to Evaporative Cooling Make-up Water—Revolutionary Technology; World Congress; Perth Convention and Exhibition Centre, Perth, Western Australia; Sep. 4-9, 2011.
Salter, Robert J.; Forward Osmosis; Water Conditioning & Purification; Apr. 2006.
McCutcheon, Jeffrey R. et al.; Desalination by ammonia-carbon dioxide forward osmosis: Influence of draw and feed solution concentrations on process performance; Journal of Membrane Science; Oct. 30, 2005.
Hancock, Nathan T. et al.; Bidirectional permeation of electrolytes in osmotically driven membrane process; Environmental Science & Technology; ACS Publications; Oct. 20, 2011.
McCutcheon, Jeffrey R. et al.; Influence of concentrative and dilutive internal concentration polarization on flux behavior in forward osmosis; Journal of Membrane Science; Jul. 24, 2006.
McCutcheon, Jeffrey R. et al.; Modeling water flux in forward osmosis: Implications for improved membrane design; American Institute of Chemical Engineers; AIChE Journal; vol. 53, No. 7; Jul. 2007.
Phillip, William A. et al.; Reverse draw solute permeation in forward osmosis: Modeling and experiments; Environmental Science & Technology; vol. 44, No. 13, May 21, 2010.
Tiraferri, Alberto et al.; Relating performance of thin-film composite forward osmosis membranes to support layer formation and structure; Journal of Membrane Science; 367 (2011) 340-352.

* cited by examiner

*Primary Examiner* — Ana Fortuna
(74) *Attorney, Agent, or Firm* — Stetina Brunda Garred & Brucker

(57) ABSTRACT

Synergies in recovery of reverse osmosis (RO) membrane process reject waste and forward osmosis (FO) membrane process water extraction, using such osmotic process byproducts in applications for makeup to evaporative cooling towers, concurrent with use of specific corrosion and scale inhibition methods that permit tower water discharge reduction to approach zero blowdown. Such synergies are derived from methods for application of subsequent RO feed water and reject wastewater with pre-treatment steps, and FO process optimization steps to permit water quality and economic performance efficiencies when used as makeup to evaporative cooling systems.

15 Claims, No Drawings

WATER CONSERVATION METHODS COMBINING OSMOTIC MEMBRANE PROCESSED WATER FOR SUBSEQUENT EFFICIENT USE IN COOLING TOWER APPLICATIONS

CROSS-REFERENCE TO RELATED APPLICATIONS

The present Non-provisional Utility Patent Application claims priority to U.S. Provisional Patent No. 61/472,299, filed Apr. 6, 2011, entitled RO REJECT WASTE RECOVERY SYNERGY WITH WCTI PROCESS; and U.S. Provisional Patent No. 61/567,021, filed Dec. 5, 2011, entitled OSMOTIC PROCESS SYNERGIES FOR WATER USE IN EVAPORATIVE COOLING WITH WCTI PROCESS, all of which are expressly incorporated herein by reference.

STATEMENT RE: FEDERALLY SPONSORED RESEARCH/DEVELOPMENT

Not Applicable

BACKGROUND

The present invention is directed to the use of waste water produced as a byproduct of an osmotic membrane application and the subsequent use of that water for cooling tower applications whereby the subsequent use of the water in such application is highly conserved and further operative to reduce scale and inhibit corrosion. As is known, reverse osmosis (RO) reject has been used as cooling tower makeup in conjunction with traditional scale and corrosion control treatment methods for cooling tower water, but to do so requires significant increased chemical treatment cost and increased cooling tower discharge of the dissolved mineral concentrates in the tower water to avoid scale and corrosion performance consequences. Thus, there was marginal value in operation of the RO system at increased operating efficiencies by increasing RO reject (reduced feed water recovery rates), as RO reject waste disposal and cost burdens were simply transferred to the cooling tower system water wastage disposal costs. Likewise, RO operators are likely to use the best quality feed water available to reduce RO reject waste volume and RO operating costs, which is usually our scarcer and more limited supply of city potable water and other broadly useful fresh water sources.

Increased RO reject wastage, particularly with use of softened RO feed water and thus soft RO reject, has also been applied for use as cooling tower makeup, but with only limited water consumption and discharge reduction benefits since the RO reject water and concentrated dissolved solids were simply being deferred to the cooling tower system for discharge from the cooling tower by blow down with use of traditional scale and corrosion index type chemistry treatments which rely on waste of a significant proportion of the tower water and dissolved solids content to avert scale and corrosion consequences. Thus, any increased RO efficiencies resulting from increasing reject flow is offset by additional costs for increased volume of RO pretreated quality feed water consumed and the deferred waste disposal costs for such combinations of RO reject use and traditional cooling tower water treatment (blow down wastage) required, which makes the practice economically and environmentally impractical and undesirable.

Forward osmosis (FO) processing has likewise recently been explored and applied to produce a source of or cooling tower makeup from brackish water sources in conjunction with use of specific manufactured chemicals introduced to the evaporative cooling water system to create a suitable osmotic or draw solution, along with use of traditional scale and corrosion control treatment methods in the cooling tower water or draw solution system. Such practices also require substantial evaporative system water discharge and/or osmotic agent recovery (removal) to avoid scale and corrosion performance consequences in the cooling system and FO process.

Review of referenced publications, studies and patents, however, disclose general deficiencies in FO processes relative to providing sufficient extraction/recovery efficiency of water to compete economically with traditional RO processes that have more highly developed membrane system designs suitable to provide the required water quality when using inferior water quality sources. The recognized disadvantages with RO processes are due primarily to the energy intensive pressure driven process and membrane fouling potentials, but these disadvantages are not outperformed economically by FO processes due to poor extraction efficiencies. The disclosed FO deficiencies are thus primarily related to cost and performance for providing suitable osmotic draw solutions, efficient osmotic extraction membrane designs, recovery of osmotic agent from the draw solution, draw solution heating, and associated further chemical treatment of the draw solution to avert scale, corrosion and biological maintenance and performance issues in the cooling tower system.

Thus, there is marginal value in the operation of the FO system as a water source for such application unless warranted by extreme scarcity of fresh water sources. The FO process would benefit from increased operating cost efficiencies by increasing FO extraction or recovery rates, reduced capital footprint costs, reduced waste production, and expansion of the range of inferior water sources that can be utilized to avert use of fresh water sources. To date, however, such commercially viable applications do not exist.

The following publications and patents identified below are believed to be pertinent as reference materials with respect to the subject matter of the present invention, all of which are expressly incorporated herein by reference.

REFERENCE PUBLICATIONS

1. Sandia National Labs, July 2006, SAND2006-4634, "Forward Osmosis: A New Approach to Water Purification and Desalination".
2. Journal of Membrane Science, June 2006, JMS (2006)70-87, "Forward Osmosis: Principles, applications and recent developments".
3. IDAWC/PER11-199, September 2011, "Manipulated Osmosis Applied to Evaporative Cooling Makeup Water".
4. Water Conditioning & Purification, April 2006, "Forward Osmosis" by Salter, HTI (Hydration Technologies, Inc.).
5. U.S. Pat. No. 3,532,621 issued Oct. 6, 1970, entitled PROCESS FOR EXTRACTING SOLVENT FROM A SOLUTION.
6. U.S. Pat. No. 3,721,621, issued Mar. 20, 1973, entitled FORWARD OSMOSIS SOLVENT EXTRACTION.
7. U.S. Pat. No. 6,391,205, issued May 21, 2002, entitled OSMOTIC DESALINATION PROCESS.
8. U.S. Pat. No. 7,879,243 B2, issued Feb. 1, 2011, entitled SOLVENT REMOVAL PROCESS.
9. U.S. Pat. No. 8,002,989 B2, issued Aug. 23, 2011, entitled OSMOTIC DESALINATION PROCESS.

10. U.S. Pat. No. 6,929,749, issued Apr. 16, 2005, entitled COOLING WATER SCALE AND CORROSION INHIBITION.
11. U.S. Pat. No. 6,949,193, issued Sep. 27, 2005 entitled COOLING WATER SCALE AND CORROSION INHIBITION.
12. U.S. Pat. No. 7,445,712, issued Nov. 4, 2008 entitled ASSEMETRIC FORWARD OSMOSIS MEMBRANES.
13. Journal of Membrane Science, 278 (2006) 114-123, "Desalination by ammonia-carbon dioxide forward osmosis: Influence of draw and feed solution concentrations on process performance".
14. Environmental Science & Technology, dx.doi.org/10.1021/es 202608y, "Bidirectional Permeation of Electrolytes in Osmotically Driven Membrane Process".
15. Journal of Membrane Science, 284 (2006) 737-747, "Influence of concentration and dilutive internal concentration polarization on flux behavior in forward osmosis".
16. AIChE Journal (July 2007) Vol. 53, No. 7, 1736-1744, "Modeling Water Flux in Forward Osmosis: Implications for Improved Membrane Design".
17. Eviron. Sci. Technol., 2010, 44, 5170-5176, "Reverse Draw Solute Permeation in Forward Osmosis: Modeling and Experimental".
18. Journal of Membrane Science, 367 (2011) 346-352, "Relating performance of thin-film composite forward osmosis membranes to support layer formation and structure".
19. U.S. Pat. No. 5,925,255, issued Jul. 20, 1999, entitled METHOD AND APPARATUS FOR HIGH EFFICIENCY REVERSE OSMOSIS OPERATION.
20. U.S. Pat. No. 6,537,456, issued Mar. 25, 2003, entitled METHOD AND APPARATUS FOR HIGH EFFICIENCY REVERSE OSMOSIS OPERATION

SUMMARY OF THE INVENTION

The present invention specifically addresses and alleviates the above-identified deficiencies in the art. In this regard, the present invention is directed to a combination of processes that are believed to provide exceptional synergistic efficiencies that result in substantial conservation of fresh water and permit increased utilization of inferior water sources. Specifically, it is contemplated that reject produced from certain RO (Reverse Osmosis) processes, including certain high efficiency RO (HERO) processes, can be converted for useful industrial applications, such as cooling tower applications. Further contemplated herein, these processes are believed to provide exceptional synergistic efficiencies to utilize certain FO (Forward Osmosis) processes, including certain high efficiency FO processes, and convert the same for useful industrial applications, such as evaporative cooling tower applications.

To that end, it is believed that the processes herein may be well-suited for use with those RO processes disclosed in U.S. Pat. No. 5,925,255, issued Jul. 20, 1999, entitled METHOD AND APPARATUS FOR HIGH EFFICIENCY REVERSE OSMOSIS OPERATION; U.S. Pat. No. 6,537,456, issued Mar. 25, 2003, entitled METHOD AND APPARATUS FOR HIGH EFFICIENCY REVERSE OSMOSIS OPERATION. The aforementioned RO processes are essentially combined with the cooling tower processes set forth in U.S. Pat. No. 6,929,749, issued Apr. 16, 2005, entitled COOLING WATER SCALE AND CORROSION INHIBITION; and U.S. Pat. No. 6,949,193, issued Sep. 27, 2005 entitled COOLING WATER SCALE AND CORROSION INHIBITION, the teachings of all such cooling tower processes are expressly incorporated herein by reference and collectively referred to herein as the WCTI methods process. In this regard, it is contemplated that the reject produced from RO processes can be easily and economically treated to attain the qualities necessary for use in evaporative cooling tower applications to provide extremely efficient water use. To enable such reject to be suitable for cooling tower applications requires the application of specific osmosis processed water pre-treatment steps before it can be used with the referenced WCTI methods for mutual osmosis-cooling tower application synergy benefits.

Such pre-treatment steps and treated makeup water quality to the evaporative cooing tower should permit control of total hardness in the evaporative tower water at less than 30 mg/L with tower water TDS concentrations less than 10,000 mg/L, or permit tower water hardness control at 1 mg/L of additional hardness above 30 mg/1 when each 1 mg/L additional total hardness is supported (non-common ion solubility effect) by 1000 mg/L of additional TDS concentration above 10,000 mg/L for each added 1 mg/l total hardness, such tower water being composed primarily of high solubility mono-valent metal ions paired with all other soluble anions.

As an alternative pre-treatment method, the total hardness ion content in the treated water is reduced by 99.50% or greater for either reverse osmosis process feed water or treated osmosis reject waste water with either feed water or reject treated water TDS concentrations up to 5000 mg/L, while operating at regeneration salt use efficiency of 4500 grains hardness removal per pound of salt use and regenerate waste water volume at less than 2% of total treated volume. To achieve that end, a commercially-available, high efficiency softening application, known as the HES pre-treatment process as designed and sold by WCTI, Inc. of Temecula, Calif., should be operative to accomplish the desired softening to meet this criteria.

In addition to use with RO processes, it is believed that methods disclosed herein may be well-suited for use with those FO (Forward Osmosis) processes disclosed in U.S. Pat. No. 3,532,621 issued Oct. 6, 1970, entitled PROCESS FOR EXTRACTING SOLVENT FROM A SOLUTION; U.S. Pat. No. 3,721,621, issued Mar. 20, 1973, entitled FORWARD OSMOSIS SOLVENT EXTRACTION; U.S. Pat. No. 6,391,205, issued May 21, 2002, entitled OSMOTIC DESALINATION PROCESS; U.S. Pat. No. 7,879,243 B2, issued Feb. 1, 2011, entitled SOLVENT REMOVAL PROCESS; U.S. Pat. No. 8,002,989 B2, issued Aug. 23, 2011, entitled OSMOTIC DESALINATION PROCESS; and in combination with the WCTI process (i.e., U.S. Pat. No. 6,929,749, issued Apr. 16, 2005, entitled COOLING WATER SCALE AND CORROSION INHIBITION; and U.S. Pat. No. 6,949,193, issued Sep. 27, 2005 entitled COOLING WATER SCALE AND CORROSION INHIBITION), the teachings of all of which are expressly incorporated herein by reference and the latter two references collectively referred to herein as the WCTI methods.

The method synergies of this invention will permit use of an expanded range of inferior RO feed water quality, including waste water reuse and remediation of inferior water sources when water scarcity and cost are at issue. Use of the WCTI methods for silica corrosion and scale control for evaporative cooling systems as an end use application for RO reject, and use of treatment steps that provide recovered RO reject quality that will permit reject use as cooling tower makeup with the WCTI process, will expand synergy opportunities, particularly with some high pH RO rejects such as produced by high efficiency RO (HERO) processing as disclosed in U.S. Pat. No. 5,925,755, issued Jul. 20, 1999 entitled PROCESS FOR THE PREPARATION OF LAMOTRIGINE; and U.S. Pat. No. 6,537,456, issued Mar. 25, 2003 entitled METHOD AND APPARATUS FOR HIGH EFFICIENCY REVERSE OSMOSIS OPERATION, the teachings of which are likewise expressly incorporated herein by reference. The synergies of the process steps will reduce waste disposal costs, reduce fresh water consumption for RO feed water, reduced chemical (acid, scale inhibitors, caustic) usage in the RO process, reduce RO energy consumption and operating cost, extend membrane life and reduce capital footprint cost for RO systems.

Similarly, the methods disclosed herein provide performance and cost synergies in production of water quality suitable for makeup to evaporative cooling systems and other process applications wherein FO systems can operate at desired water (solvent) extraction or recovery rates with significantly higher cost efficiencies using certain osmotic (FO) processes. The method synergies will permit use of an expanded range of inferior water sources such as brackish water, sea water, high total dissolved solids (TDS) water, waste water, water containing total suspended solids (TSS), and water containing other objectionable chemical or physical constituents that normally prohibit it's use, specifically where water scarcity and cost are at issue.

Use of the WCTI processes for the concurrent treatment of evaporative cooling systems as an end use application for FO process extraction or recovery, and FO process optimization steps that provide FO derived water (solvent) quality and economy that will permit such derived water use as cooling tower makeup with the WCTI methods, will expand synergy opportunities, particularly with current limitations in FO process extraction or recovery efficiencies that have limited FO use for many inferior water sources (see, for example, U.S. Pat. No. 3,532,621, issued Feb. 26, 1969, entitled PROCESS FOR EXTRACTING SOLVENT FROM A SOLUTION; U.S. Pat. No. 3,721,621, issued Mar. 20, 1973, entitled FORWARD-OSMOSIS SOLVENT EXTRACTION; U.S. Pat. No. 6,391,205, issued May 21, 2002, entitled OSMOTIC DESALINIZATION PROCESS; U.S. Pat. No. 7,879,243 B2, issued Feb. 1, 2011, entitled SOLVENT REMOVAL PROCESS; U.S. Pat. No. 8,002,989 B2, issued Aug. 23, 2011, entitled OSMOTIC DESALINATION PROCESS). The synergies of the invention process steps will reduce waste disposal costs, reduce fresh water consumption, reduce chemical (acid, scale inhibitors, caustic) use and discharge, reduce energy operating cost, extend membrane life and reduce capital footprint cost for such FO systems and evaporative cooling applications.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

The present invention is directed to methods for conserving water whereby water produced via the application of an osmotic membrane, and in particular the reject waste produced from reverse osmosis or process water extraction produced from forward osmosis, is further utilized in cooling tower applications that result in highly conserved water usage with minimal treated water wastage. In this regard, the present invention is operative to utilize water produced by either reverse osmosis (RO) or forward osmosis (FO). The benefits realized from either process will be readily appreciated, and set forth more fully below with respect to each specific osmotic process.

RO Membrane Processed Water Synergy

In one aspect of the present invention, it is contemplated that the reject waste water produced via RO membrane processes will be ideally suited as the source from which the water is initially derived. As will be appreciated by those skilled in the art, the makeup flow volume required to supply makeup to evaporative cooling towers operating in the same facilities that also require and operate RO produced (permeate) quality water (such as microelectronics processing and power plant boiler feed water) will typically far exceed the normal RO reject waste flow volume available for recovery and reuse. If the cooling tower water treatment methods used for control of scale and corrosion is not limited by the mineral content of the reject stream, and also does not require tower system water blow down or water wastage (approaches zero blow down), all of the reject waste water can be evaporated, with proper pre-treatment, to reduce overall water consumption and avert RO reject waste water treatment costs and consequences. The present invention takes advantage of this opportunity.

The present invention capitalizes on this opportunity by combining proper pretreatment steps and recovery of RO reject waste for cooling tower makeup with such WCTI methods that permit reduced or minimal cooling tower water wastage (approaching zero blowdown), and therefore also permits increases in RO reject waste flow without consequence since the increased reject water flow can be used by the cooling tower without added water use and disposal cost for tower water blow down wastage required with traditional scale and corrosion index limits (mineral concentration control limits) required with traditional water treatment methods. Thus, increased the RO reject waste flow can be used to increase RO operational efficiencies and increase produced water (permeate) quality without economic or environmental consequence. Such novel combination of pre-treatment steps and recovery of RO reject as a cooling tower makeup source with the significantly reduced tower blow down wastage allowed with application of WCTI silica chemistry methods that mitigate traditional scale and corrosion limitations, will avert traditional tower water discharge volumes and treatment costs or their environmental consequences for traditional waste water disposal methods.

Significant RO process efficiencies and synergy occur with operation at increased reject flow to reduce TDS concentration and operating pressure, providing reduced RO equipment energy consumption. Operation with increased reject flow can also permit use of lower quality and/or lower cost feed water sources without sacrificing permeate (produced water) quality, or increasing energy consumption and maintenance costs. For example, typical HERO membrane processes will operate between the ranges of 10,000 to 15,000 TDS concentration, while traditional RO systems will operate between 1500 to 5000 TDS, dependent on which if any feed water pre-treatment methods are used such as acid feed/pH reduction, softening, chemical scale inhibitors or combinations thereof. For example, typical HERO and RO systems and their elements will operate below 1200 psi pressure, although more costly RO elements may be used and operated at 1450 psi pressure. Such increased RO efficiencies using increased reject flow is known by those skilled in RO operation, however increased reject flow is not commonly practiced due to the added water consumption and discharge volume treatment cost consequences. Use of RO reject for cooling tower makeup is also known by those skilled in the art, but again not commonly practiced due to the economic consequences of transfer of added traditional water treatment costs and increased cooling tower blow down waste disposal costs from the RO discharge to the cooling tower discharge.

The novel disclosure in this application is that this combination of treatment methods will provide previously impractical improvements in the RO process operation efficiencies noted in this application without offsetting increases in water consumption, treatment cost and waste water disposal costs. In other words, the significant improvement in RO process-cooling tower operation efficiencies is novel, when applied concurrently with the water consumption reduction and discharge reduction that is attainable when combined with the WCTI silica based cooling tower treatment and discharge reduction methods. Such novel synergy is permitted since the WCTI method chemistry is not impacted by high TDS or high silica water quality limitations for traditional water treatment. Essentially, 98% or greater of the RO feed water produced can be used to supply the required RO permeate water quality consumed and concurrently contribute to meeting the cooling tower water evaporation requirement for waste heat rejection, with optimum efficiencies for both RO and cooling tower operation.

The second novel disclosure in this application involves RO feed water and RO reject treatment methods to make RO reject suitable for application as cooling tower makeup by meeting the requirements for application of the WCTI silica chemistry methods that enable approach to zero blow down cooling tower operation. Such RO feed water pre-treatment and/or RO reject pre-treatment methods can potentially involve 1) cost economic pretreatment processes for RO Feed Water hardness removal (such as may be achieved through WCTI's current HES™ softening technology or other high efficiency softening), 2) cost economic processes for removal of hardness from RO Reject water (such as may be achieved through WCTI's current HES or high efficiency softening), and 3) re-carbonization or other suitable chemical buffering of alkalinity in RO reject to reduce excess hydroxide alkalinity content from HERO or other RO process reject streams. These pre-treatment steps permit cost efficient operation of the combined RO process and cooling tower evaporative systems by reducing water consumption costs, chemical treatment costs and minimizing discharge treatment costs. Further, these steps concurrently permit increased RO operation efficiencies noted with the operation with increased reject flow or use of lower cost inferior source water quality.

In use, for an RO application an exemplary pre-treatment application would be to collect the waste water produced from a pressurized reverse osmosis reject stream-type RO osmosis application, and thereafter treating the reject waste water to remove hardness ions to less than 0.5% of source concentration and preferably less than 0.25% of source concentration. Such pre-treatment steps and treated makeup water quality fed to the evaporative cooing tower should permit control of total hardness in the evaporative tower water at less than 30 mg/L with tower water TDS concentrations less than 10,000 mg/L, or permit tower water hardness control at 1 mg/L of additional hardness above 30 mg/l when each 1 mg/L additional total hardness is supported (non-common ion solubility effect) by 1000 mg/L of additional TDS concentration above 10,000 mg/L for each added 1 mg/l total hardness, such tower water being composed primarily of high solubility mono-valent metal ions paired with all other soluble anions.

To that end, the silica concentration may be further adjusted as necessary to reach or exceed 200 mg/L, preferably greater than 300 mg/L as $SiO_2$ in the evaporative cooling solution and further the pH would be adjusted to 9 or higher via either concentration of natural carbonate alkalinity in the source water, or addition of the chemical additives disclosed in this invention that will neutralize hydroxide alkalinity to form such buffered alkalinity residuals to result in pH levels within the WCTI corrosion and scale control patent performance ranges to thus produce the water that would then be applied for a specific cooling tower application.

The benefits of the processes of the present invention as they relate to the use of RO-derived water, may be achieved through the primary steps below:

A. Operation of RO (reverse osmosis) processes to produce treated water (permeate) of suitable quality to meet application requirements by virtue of the following steps;

1. Pre-treatment removal of hardness ions from RO feed water preferably achieved by high efficiency softening (HES) or using SAC (strong acid cation resin) or other ion exchange resin forms that remove hardness or other polyvalent metal ions by exchange with mono-valent metal ions such as sodium and potassium. Various other pre-treatment processes or combination of processes, such as chemical precipitation softening, in combination with ion exchange softening, may also be used.

Typically, the HES™ pre-treatment process as designed by WCTI should reduce total hardness ion content in the treated water by 99.50% or greater for either osmosis process feed water or treated osmosis reject waste for treated water with TDS concentrations up to 5000 mg/L, while operating with regeneration salt use efficiency of 4500 grains hardness removal per pound of salt use and regenerate waste water volume at less than 2% of total treated volume.

2. Cost efficient removal of hardness ions from RO reject, when hardness has not been removed from the RO feed water, by high efficiency softening (HES) or using SAC or other ion exchange resin forms that remove hardness or other polyvalent metal ions by exchange with mono-valent metal ions such as sodium and potassium.

In this regard, depending on the specific application, the hardness ions are removed either before or after the RO process. Step 1) contemplates the former from RO feed water and step 2), the latter from RO reject.

3. Pre-treatment removals of hardness from the RO feed water by various other pre-treatment processes known in the art or in combination of processes to produce required permeate quality and desired permeate recovery rates.

4. Removal or stripping of carbon dioxide gas and carbonate alkalinity from the RO feed water.

5. Addition of hydroxide alkalinity to the RO feed water to result in an increase the pH of the RO concentrate water (reject waste water) to a pH range of 9 to 11.

6. Passing an increased proportion of said feed water as permeate of suitable quality for the end use application.

B. Restoration of carbonate alkalinity (carbonate buffer) to the RO reject waste to reduce the high pH (hydroxide ion concentration) to a suitable quality to permit use as cooling tower makeup in conjunction with treatment of the cooling water with the WCTI methods that produce silica corrosion inhibition of metals contacted by very high concentrations of TDS, and silica scale inhibition on heat transfer surfaces. The carbonate alkalinity (and/or alkalinity/pH buffer) pre-treatment steps being comprised of one or more of:

1. Infusion, injection and use of carbon dioxide gas feed into the RO reject waste water to re-carbonate and reduce hydroxide alkalinity to suitable levels for use with silica corrosion control chemistry in the cooling system. Such pre-treatment steps for the treated makeup water quality to the evaporative cooing tower should result in neutralization and conversion of excess hydroxide alkalinity to carbonate alkalinity or other chemically buffered forms of alkalinity where the proportion of P-alkalinity (phenolphthalein) is less than 10% of the M-alkalinity (total or methyl orange) with resulting treated source makeup water is at less than 9 pH; and/or permit control to provide a derived alkalinity equation result of 2P−M=<5 mg/L (as $CaCO_3$) of hydroxide alkalinity in the evaporative cooling tower water resulting in a tower water at 10.0 pH or less. Such step advantageously enables substantial quantities of water that would otherwise be wasted to assume the properties that are ideally suited for subsequent use with the WCTI methods for corrosion and scale control in cooling tower applications, and is also conditioned in such a manner that enables such water usage to be maximized by allowing for greater cyclical use with less water wastage.

2. Infusion, injection, and use of sodium carbonate feed into the reject waste stream to re-carbonate and reduce P-alkalinity proportion of total M-alkalinity to required to suitable levels for use with silica corrosion control chemistry in the cooling system. Other suitable weak acid salt buffers such as sodium tetra borate may also be used as alkalinity buffers, as well as potassium and other mono-valent salts of weak acids may be used for neutralization of excess hydroxide alkalinity.

3. Reliance on the previously accumulated or established buffering concentration of carbonate in the cooling tower water from prior makeup water carbonate evaporation and concentration, or from hydroxide alkalinity conversion by carbon dioxide contained in air being extracted into the water when passed through tower water circulated over the tower water evaporation structure. Further, by increased natural alkalinity retention with sufficient RO pre-treatment and control adjustment to reduce caustic use and pH level hydroxide ion concentration as noted in further steps that follow.

4. Use of other suitable (compatible with natural silica polymerization chemistry in the WCTI methods) and economically feasible chemical buffers that will reduce the concentration of hydroxide alkalinity in the RO reject that would subsequently be concentrated by evaporation in the tower circulating water to reduce reliance on a limited rate of conversion by carbon dioxide extraction from contact with air. Such acceptable buffers or hydroxide neutralizers for example may include citric acid, boric acid, sulfonic acid, acetic acid or other weak acids, or mineral acids such as sulfuric, nitric or hydrochloric acid.

C. Derive RO process economic and/or permeate quality improvement synergy through operation of the RO process at reduced TDS concentrations below 15,000 mg/L, and/or RO operation below 1500 psi to reduce energy consumption while producing desired treated water quality (permeate). For example, typical HERO membrane processes will operate between the ranges of 10,000 to 15,000 TDS concentration, while traditional RO systems will operate between 1500 to 5000 TDS, dependent on which if any feed water pre-treatment methods are used such as acid feed/pH reduction, softening, chemical scale inhibitors or combinations thereof. For example, typical HERO and RO systems and their elements will operate below 1200 psi pressure, although more costly RO elements may be used and operated at 1450 psi pressure:

1. Synergy derived through use of properly pretreated RO feed water and/or softened and/or pH adjusted RO reject in conjunction with the WCTI methods used to treat evaporative cooling systems, wherein an outlet is provided for the increased reject wastage flow being used as makeup to a cooling tower to meet water evaporation consumption demand that is evaporated to remove various sources of process and comfort cooling waste heat.

2. Derived synergy through operation of the RO process to provide suitable treated permeate water quality with a lower concentrate or reject waste pH, reduced caustic consumption cost, and reduced treatment cost requirements as specified above for re-carbonation or alkalinity buffering of reject waste to be suitable for cooling tower makeup use with the WCTI methods.

D. Permit reduced water consumption and discharge reduction synergy through pre-treatment of RO feed water or reject waste water to permit it's use to reduce consumption of scarce or limited potable and fresh water supplies currently used to meet cooling evaporation demand, and reduction of RO waste discharge treatment costs and environmental impact. High efficiency softening pre-treatment and the WCTI methods permit reduction in quantities of TDS (minerals concentrated in RO reject or concentrated by cooling tower evaporation) that are discharged to the environment by proportionately reducing the consumption of water wasted by both RO and traditional cooling water treatment, and the accompanying accumulation of minerals (TDS) naturally contained in all source waters through tower evaporation or RO concentration processes before discharge.

E. Provides environmental synergy by permitting disposal and useful application of lower quality source water and waste waters not suitable for fresh water applications (human, animal and irrigation requirements), and averting use of more expensive capital and energy intensive alternatives for disposal.

FO Membrane Processed Water Synergy

The novel disclosures further contemplate the combination of FO and WCTI method technologies, accompanied by FO process-cooling tower efficiency improvements that will provide previously unattainable increase in the FO performance and cost efficiencies noted in this application. Such efficiency improvements are provided through reductions in capital footprint costs, osmotic agent use and recovery costs, evaporative cooling system treatment cost, and waste water disposal costs. In other words, the combination of significant increases in FO efficiencies with the synergies of these combined methods is novel. Such novel synergies are concurrent with enabling use of an expanded range of inferior raw FO feedwater sources that can be used economically, and reduction in waste water discharge volume when combined with the WCTI silica based cooling tower treatment methods. Such discharge reduction, provided by the WCTI method chemistry for corrosion and scale control, is permitted as it is not impacted by the high TDS or high silica limitations in water quality with use of traditional cooling water treatment methods. Essentially, 98% or greater of the FO extracted makeup water can be used to meet cooling tower evaporation requirement for waste heat rejection, while enabling optimum efficiencies for both FO process and cooling tower operation, which has not heretofore been available.

The primary steps of such methods and the benefits derived therefrom comprise:

A. Operation of FO (forward osmosis) processes to produce treated water (extracted permeate water) of suitable quality to meet evaporative cooling system application requirements by virtue of the following steps:

1. Pre-treatment reduction of hardness ions from evaporative cooling system makeup water by the forward osmosis membrane processes, or supplemental treated water makeup introduced directly to the cooling tower system wherein hardness has been reduced by any suitable removal process as specified in WCTI patent methods, to meet method requirements that permit the silica corrosion and scale control methods to mitigate corrosion and scale consequences to the evaporative cooling system.

Such pre-treatment steps and treated makeup water quality to the evaporative cooing tower should permit control of total hardness in the evaporative tower water at less than 30 mg/L with tower water TDS concentrations less than 10,000 mg/L, or permit tower water hardness control at 1 mg/L of additional hardness above 30 mg/l when each 1 mg/L additional total hardness is supported (non-common ion solubility effect) by 1000 mg/L of additional TDS concentration above 10,000 mg/L for each added 1 mg/l total hardness, such tower water being composed primarily of high solubility mono-valent metal ions paired with all other soluble anions. Typically, the proprietary high efficiency softening process, HES™ pre-treatment process as designed by WCTI, and commercially available through WCTI based in Temecula, Calif., should reduce total hardness ion content in the treated water by 99.50% or greater for cooling tower makeup water with treated water TDS concentrations up to 5000 mg/L, while operating at regeneration salt use efficiency of 4500 grains hardness removal per pound of salt use and regenerate waste water volume at less than 2% of total treated volume.

2. Concentration of TDS contained in cooling system makeup water sources from which hardness ions have been removed, being primarily in the form of mono-valent metal salts (primarily sodium), to form soluble salt concentrations required for optimum draw solution performance (up to 200,000 mg/l). The solubility of common sodium salts typically contained in surface or well water sources should not be exceeded, for example sodium carbonate solubility is approximately 150,000 mg/L at 25° C. temperature, is the most common solubility limiting salt.

3. Application of the derived TDS concentrations from source water cyclically evaporated in the cooling tower circulating water as the osmotic draw solution, with source water either being provided through separate makeup of softened source water to the cooling tower or soft water passed through a FO (or direct osmosis) system membrane used to extract water from various inferior water quality sources.

4. Use of suitably designed osmosis membrane permitting desired osmotic driving force for efficient water extraction and rejection of undesired ion species.

5. Use of best available membrane technology that will minimize passage of polyvalent metal ions as required for WCTI methods. In this regard, it is believed that a further benefit of the invention may be provided for osmosis system efficiencies since membranes would not be required to minimize passage of mono-valent metal ions or their non-metal ion pairs or their salts.

For example, such FO membrane construction, the impact of draw solution composition on osmotic flow, salt rejection properties of membranes, ongoing development of membrane construction materials and their design architecture are discussed in such previously cited references 1, 2, 4, and 7-18. Use of enhanced membrane ion passage selectivity with this invention process could further increase water extraction while concurrently allowing passage of natural draw solution ions to maintain the desired osmotic draw agent concentration in the evaporative cooling solution or draw solution of the system, replacing ions lost through tower drift or other cooling water losses.

6. A limited or controlled volume of the concentrated draw solution can be discharged continuously back into the spent forward osmosis waste water or inferior water source for treatment or recycle as warranted, to optimize osmotic driving force and avert draw solution solubility limitations. No toxic constituents (only natural or innocuous mineral salts) will be contained in the draw solution. Added capital and operating costs for extraction of draw agent from the cooling tower system water can thus be averted for increased efficiency.

7. Direct supplemental addition to the cooling tower or FO draw solution as required of a commodity draw agent or salt composed primarily of mono-valent metal cations such as sodium. Further, supplemental addition of WCTI method specified chemicals such as commodity product sources of silica or alkalinity should be added to supplement deficiencies of natural silica and alkalinity contained in the softened makeup water from either the FO permeate makeup or supplemental cooling tower makeup sources as required to maintain desired draw solution concentration and WCTI process control chemistry conditions. Such common and inexpensive commodities may include, but are not limited to, sodium chloride (salt) for osmotic agent concentration maintenance, sodium carbonate (soda ash) for pH control between 9 to 10, and sodium silicates for desired corrosion inhibition residual. As will be appreciated by those skilled in the art, by virtue of the FO process, the water will be devoid of such elements necessary to enhance and conserve the use of such water in subsequent evaporative cooling tower applications. In this regard, supplemental silica will need to be fed to the tower water separately since the FO will not permit silica to pass through the membrane. This is likewise applicable for alkalinity, which initially must be adjusted and controlled to 9.0 or less (and will subsequently become elevated in the range of pH 9-10 during evaporative cooling tower use). As a further consideration, it will be understood that the total dissolved solids (TDS) will have to be maintained to at least 10,000 mg/L, as discussed above.

8. Passing an increased proportion of said extracted FO water as the evaporative cooling system makeup and concurrent draw solution makeup with suitable quality for the described combined and synergistic cooling tower evaporative end use application.

The foregoing methods provide a process utility that will permit performance and cost synergies in production of water quality suitable for high purity end use as well as other osmosis process applications wherein RO and FO systems can operate at lower system pressure, lower operating energy consumption, reduced chemical use and reduced capital footprint cost, while mitigating costs associated with additional osmosis process water consumption and waste discharge treatment. Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A method for deriving water from an osmotic membrane application and subsequent use thereof in an evaporative cooling tower application comprising the steps:
    a) generating a source of water via a by-product of a reverse osmotic membrane application, wherein said by-product is reject waste water;
    b) removing hardness ions from said water produced in step a);
    c) adjusting the concentration of silica present in the water treated to remove said hardness ions in step b) such that the silica concentration will reach a concentration of at least 200 mg/L (as SiO2) when concentrated by evaporation in an evaporative cooling tower system;
    d) applying said water produced in step c) to an evaporative cooling tower application; and
    e) adjusting and controlling the pH of said water applied to the evaporative cooling tower application in step d) to 9.0 or greater.

2. The method of claim 1 wherein said hardness ions comprise ions of calcium and magnesium.

3. The method of claim 1 further comprising the step:
    f) cyclically performing said cooling tower application.

4. The method of claim 1 wherein in step c), said silica concentration is adjusted to maintain a level of at least 300 mg/L or higher when concentrated by evaporation in said evaporative cooling tower system.

5. The method of claim 1 wherein in step b), said hardness ions are sufficiently removed such that said hardness ions are present in an amount less than 0.5% of said water produced in step a).

6. The method of claim 5 wherein in step b), said hardness ions are sufficiently removed such that said hardness ions are present in an amount less than 0.25% of said water produced in step a).

7. The method of claim 1 wherein in step e), said pH is elevated via concentration of carbonate alkalinity naturally occurring in said water produced in step c).

8. The method of claim 1 wherein in step b), said hardness ions are sufficiently removed such that said hardness ions are present in an amount of 30 mg/L or less in the tower water when concentrated by evaporation.

9. The method of claim 1 wherein in step a), said reverse osmosis application is operative to produce reject waste water having total dissolved solids (TDS) of less than 15,000 mg/L.

10. The method of claim 1 wherein in step b), said hardness ions are removed in an amount sufficient such that the total hardness of the water used in step d) in the evaporative cooling tower application is maintained at a ratio relative the total dissolved solids (TDS) of approximately 3:1,000 or less.

11. The method of claim 10 wherein in step b), said total hardness is maintained at 30 mg/L or less and said total dissolved solids are equal to less than 10,000 mg/L.

12. The method of claim 10 wherein in step b), said total hardness ions are removed to an amount sufficient such that in step d), said total hardness in the evaporative cooling tower is allowed to increase by 1 mg/L provided the total dissolved solids correspondingly increase in concentration by a corresponding 1,000 mg/L.

13. The method of claim 1 wherein in step a), said reverse osmosis application is operative to produce reject waste water having total dissolved solids (TDS) increasingly below 15,000.

14. The method of claim 1 wherein in step a), said reverse osmosis application is operative to produce reject waste water at pressure increasingly below 1500 psi.

15. The method of claim 1 further comprising wherein step d) further comprises adding additional makeup water to said evaporative cooling tower application, wherein said additional makeup water is in part a treated reverse osmosis reject stream and said addition of makeup water maintains or decreases blowdown volume.

* * * * *